(No Model.)
H. PARKER.
WINDOW SHADE FIXTURE.
No. 522,384.        Patented July 3, 1894.
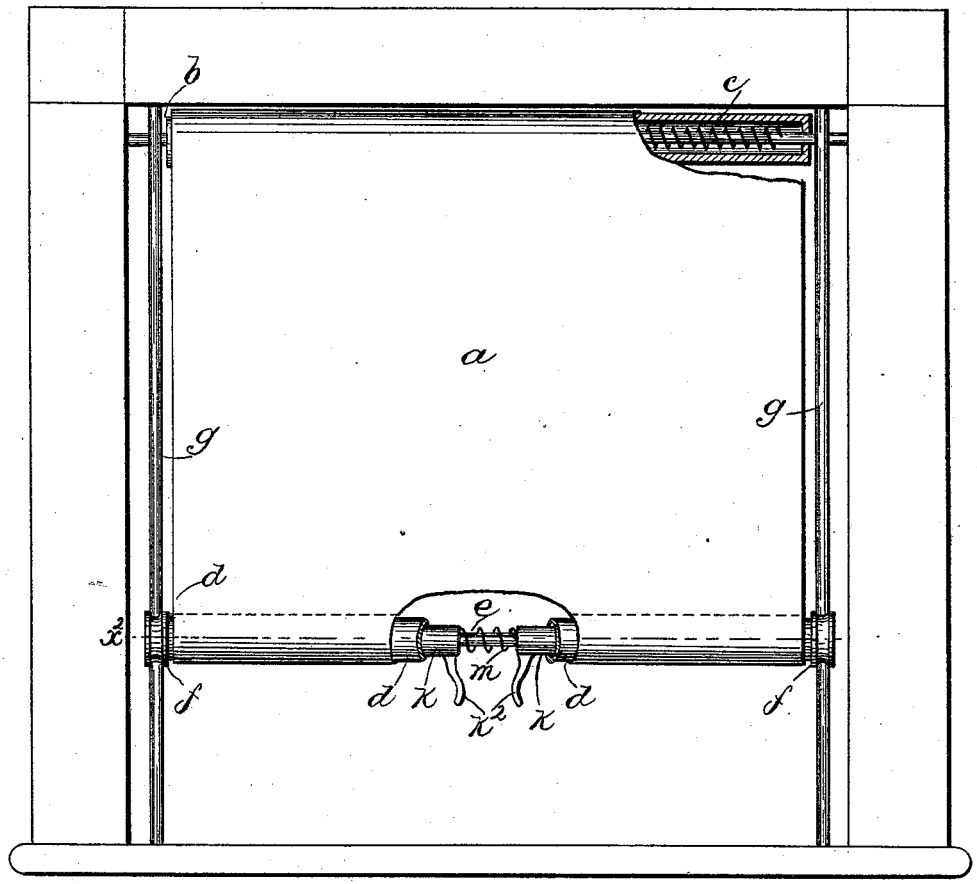
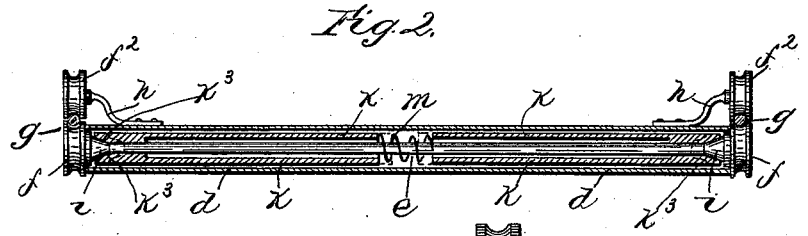
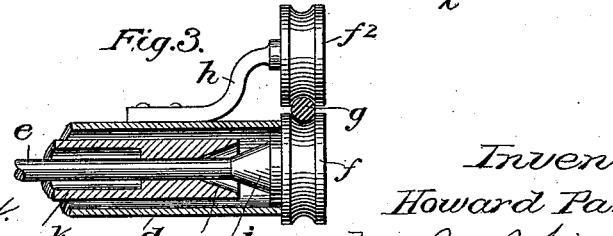
Witnesses
Jas. J. Maloney
M. E. Hice
Inventor,
Howard Parker.
by Jno. P. Dinmore
Atty.

UNITED STATES PATENT OFFICE.

HOWARD PARKER, OF ST. JOHNSBURY, VERMONT.

WINDOW-SHADE FIXTURE.

SPECIFICATION forming part of Letters Patent No. 522,384, dated July 3, 1894.

Application filed November 20, 1893. Serial No. 491,485. (No model.)

*To all whom it may concern:*

Be it known that I, HOWARD PARKER, of St. Johnsbury, county of Caledonia, State of Vermont, have invented an Improvement in Window-Shade Fixtures, of which the following description, in connection with the accompanying drawings, is a specification, like letters on the drawings representing like parts.

My invention relates to a mechanism for controlling the operation of a window shade in conjunction with a shade roller acted upon by a spring or other force tending to turn the same in the direction to wind the shade thereon.

The invention relates to mechanism connected with the lower or running end of the shade by which the latter is held in any position in the window frame against the strain tending to wind up the shade, but may be readily raised or lowered by the operator as desired. The said mechanism is connected with a stick or cross-bar connected with the lower end of the shade in such manner as to hold it in flat tense condition, the said bar being provided at each end with a pair of wheels or rollers arranged to run on a vertical guide in the window frame. The said guide is shown in this instance as consisting of a round wire or rod and the pair of rollers co-operating with each rod have grooved peripheries which receive the rod between them and bear frictionally thereon so that when the said rollers are free to rotate they will run up and down freely upon the guide rod, so that the lower end of the shade may be run up or down as required; and a locking device is provided for preventing the rotation of said rollers in which case their friction upon the guide rod is sufficient to prevent them from moving along the same under the force applied tending to wind the shade on the roller. The said locking device is shown in this instance as having a frictional action and is controlled by handles arranged to be conveniently manipulated by the operator desiring to lower or raise the shade, said locking device being acted upon by a spring tending to bring the same to a condition to lock the wheels when the handles are released by the operator.

Figure 1 is a front elevation of a window shade and actuating mechanism therefor embodying this invention, with portions broken away to show the working parts; Fig. 2 a sectional plan on line $x^2$, Fig. 1, and Fig. 3 a similar sectional plan on a larger scale, showing the locking device in position to release the rolls and permit the shade to run up and down freely.

The shade $a$ is connected in the usual manner with the winding roller $b$ which may be acted upon by a spring as indicated at $c$ with a tendency to wind the shade $a$ thereon in the usual manner.

The lower or running end of the shade $a$ is connected with a stick or cross bar shown as a tube $d$ containing within it a shaft $e$ provided at its ends with wheels or rollers $f$ which run upon stationary guide ways $g$ in the window frame said guide ways being shown in this instance as stout rods, and the wheels $f$ being grooved to engage with said rods. The cross bar $d$ also has connected with it two other wheels or rollers $f^2$ each of which corresponds to one of the rolls $f$, and is so arranged as to bear against the guide $g$ opposite the point at which the wheel $f$ engages the said guide. The said wheels $f^2$ are journaled on brackets $h$ fastened to the cross bar $d$ and made of spring metal so applied as to cause each pair of wheels $f, f^2$, to press firmly against the rod $g$ between them.

The ends of the cross bar $d$ are thus caused to follow the guide $g$ but can run up and down freely thereon when the said wheels $f, f^2$, are free to turn. If, however, the rotation of said wheels is arrested the frictional hold of the wheels on the guides $g$ is too great to be overcome by the pull of the winding spring $c$ on the shade $a$ and thus by arresting or resisting the rotation of the wheels the cross-bar $d$ and the lower end of the shade connected therewith may be caused to remain at any desired height on the guides.

In order to control or arrest and release the wheels $f$ when desired a locking device is provided, which as shown in this instance acts as a brake or frictional resistance to the rotation of the wheels $f$ and which is constructed as follows:—The said wheels $f$ or the shaft $e$ adjacent thereto is provided with a conical bearing piece $i$ and the tube $d$ contains within it co-operating friction devices shown as tubular pieces $k$ extending from the cones $i$ to a point near the middle of the cross bar, where the said devices $k$ are provided with handles $k^2$ see Fig. 1, extending through a slot in the tube $d$ so that the said handles $k^2$ and connected clutch members or locking devices $k$ can move longitudinally in the cross bar $d$ but are prevented from rotating with the shaft $e$ and the wheels $f$. The said tubular pieces $k$ are provided at their outer ends with tapering sockets $k^3$ corresponding to the cones $i$ so that when the said sockets are pressed against the said cones they frictionally resist the rotation thereof and thus resist the rotation of the shaft $e$ and wheels $f$ connected therewith.

The clutch members $k$ constituting the locking device are pressed toward the ends of the shaft so as to produce frictional contact between socket portions $k^3$ and cones $i$ by means of a spring $m$ interposed between the inner ends of the said pieces $k$ and thus pressing both of them into firm contact with the cones $i$ so as to resist the rotation of the wheels $f$ sufficiently to prevent them from running on the guides $g$ under the pull of the shade roller on the shade.

When it is desired to move the shade up or down the operator takes hold of the handles $k^2$ and by pressing them together slightly overcomes the pressure of the spring $m$ and relieves the frictional pressure at $k^3$, $i$, and thus unlocks the wheels $f$ so that they will run freely along the guides $g$ as the operator raises or lowers the shade, and then the operator lets go of the handles $k^2$. After the shade is properly adjusted the wheels are again locked and the shade restrained from further movement until another adjustment is desired. The wheels $f$ being connected with the same shaft have an equal movement and there is consequently no tendency to tip the shade stick or cross bar $d$, or to bring one end of the shade higher than the other.

I claim—

1. The combination of the window shade and self winding roller therefor; with stationary guides $g$; a cross bar connected with the free or running end of the shade; wheels supported at the ends of said cross bar and engaging with said guides, a shaft connected with the said wheels and a locking device for controlling the rotation of said shaft and wheels connected therewith, substantially as described.

2. The combination with the window shade, with a tubular cross bar $d$ and shaft therein, provided with wheels $f$ and cooperating wheels $f^2$ connected by spring bearings with said cross bar; and a spring actuated locking device $k$, $k^3$, provided with handles $k^2$, substantially as described.

In testimony whereof I have signed my name to this specification in the presence of two subscribing witnesses.

HOWARD PARKER.

Witnesses:
NELLIE M. PARKER,
ANDREW WYRE.